(12) United States Patent
Li et al.

(10) Patent No.: US 9,310,055 B2
(45) Date of Patent: Apr. 12, 2016

(54) LIGHTING DEVICE, A METHOD OF CONTROLLING THE SAME, FOR SELECTIVELY EMITTING LIGHT ALONG OR AGAINST TRAFFIC DIRECTION

(71) Applicant: KONINKLIJKE PHILIPS N.V., Eindhoven (NL)

(72) Inventors: Wenyi Li, Shanghai (CN); Wenting Cheng, Shaighai (CN)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/414,223

(22) PCT Filed: Jul. 5, 2013

(86) PCT No.: PCT/IB2013/055506
§ 371 (c)(1),
(2) Date: Jan. 12, 2015

(87) PCT Pub. No.: WO2014/013380
PCT Pub. Date: Jan. 23, 2014

(65) Prior Publication Data
US 2015/0211716 A1    Jul. 30, 2015

(30) Foreign Application Priority Data

Jul. 17, 2012   (WO) ................ PCT/CN2012/078758

(51) Int. Cl.
| | |
|---|---|
| *F21V 14/02* | (2006.01) |
| *H05B 37/02* | (2006.01) |
| *F21S 8/08* | (2006.01) |
| *F21W 131/103* | (2006.01) |

(52) U.S. Cl.
CPC ................. *F21V 14/02* (2013.01); *F21S 8/086* (2013.01); *H05B 37/0245* (2013.01); *F21W 2131/103* (2013.01); *Y02B 20/72* (2013.01)

(58) Field of Classification Search
USPC ............................................ 362/36, 431, 802
See application file for complete search history.

(56) References Cited

U.S. PATENT DOCUMENTS

| | | | | |
|---|---|---|---|---|
| 7,628,508 | B2* | 12/2009 | Kita et al. | ............... F21S 8/086 362/231 |
| 2006/0251182 | A1 | 11/2006 | Colak | |
| 2007/0014119 | A1* | 1/2007 | Burkett | ................ B60Q 1/1423 362/459 |
| 2007/0273500 | A1 | 11/2007 | Chiu | |
| 2011/0074313 | A1 | 3/2011 | Gordin | |

FOREIGN PATENT DOCUMENTS

| | | |
|---|---|---|
| DE | 4431750 A1 | 3/1996 |
| DE | 202008004790 U1 | 8/2008 |

(Continued)

*Primary Examiner* — Laura Tso (57) ABSTRACT

The invention proposes a lighting device (250). The lighting device (250) for road lighting comprises a lighting module and a control module coupled to the lighting module, and configured to control the lighting module to radiate a first light beam (221) towards a first direction to generate a first lighting pattern on the road surface (B), when a first predetermined condition is satisfied, and to control the lighting module to radiate a second light beam (231) towards a second direction to generate a second lighting pattern on the road surface (A), when a second predetermined condition is satisfied, wherein the first direction is oriented to go along the traffic direction and the second direction is oriented to go opposite the traffic direction.

13 Claims, 4 Drawing Sheets

(56) References Cited

FOREIGN PATENT DOCUMENTS

| | | |
|---|---|---|
| DE | 102007061160 A | 6/2009 |
| JP | 61138404 A | 6/1986 |
| JP | 5120904 A | 5/1993 |
| JP | 2002063803 A | 2/2002 |
| JP | 2007210377 A | 8/2007 |
| JP | 2008258007 A | 10/2008 |
| JP | 2011253772 A | 12/2011 |
| JP | 2012038671 A | 2/2012 |
| WO | 2010106104 A1 | 9/2010 |
| WO | 2010125325 A1 | 11/2010 |
| WO | 2011046464 A1 | 4/2011 |

* cited by examiner

LIGHTING DEVICE, A METHOD OF CONTROLLING THE SAME, FOR SELECTIVELY EMITTING LIGHT ALONG OR AGAINST TRAFFIC DIRECTION

CROSS-REFERENCE TO PRIOR APPLICATIONS

This application is the U.S. National Phase application under 35 U.S.C. §371 of International Application No. PCT/IB2013/055506, filed on Jul. 5, 2013, which claims the benefit of CN Application No. PCT/CN2012/078758, filed on Jul. 17, 2012. These applications are hereby incorporated by reference herein.

FIELD OF THE INVENTION

The present invention relates to lighting, and particularly to a lighting device, a lighting apparatus comprising the lighting device, a lighting system comprising a plurality of lighting apparatuses and a method of controlling the lighting device.

BACKGROUND OF THE INVENTION

With fast pace of urbanization and well road construction, road lighting is playing an important role in the whole city lighting system. When developing a lighting device for road lighting, different requirements have to be satisfied. First, the most important target for road lighting is to ensure road traffic safety, and to achieve this goal, the factors such as the road surface luminance, no glare, the visibility of objects, etc., should be considered. However, among these factors, the visibility of objects is always neglected for road lighting design.

Second, the energy saving of the lighting device should be taken into account. To reduce energy consumption, some intelligent lighting control systems take an energy-saving approach by reducing the power of road lighting at midnight with a sacrifice of average luminance level. Such an approach is based on the assumption that at midnight, the vehicle flow rate is relatively lower, so the visual tasks for drivers are easier, and a lower luminance level can be still sufficient. However, at midnight, drivers tend to be tired and drowsy; therefore reducing the lighting level could lead to a risk of traffic accident.

OBJECT AND SUMMARY OF THE INVENTION

Figure 1:
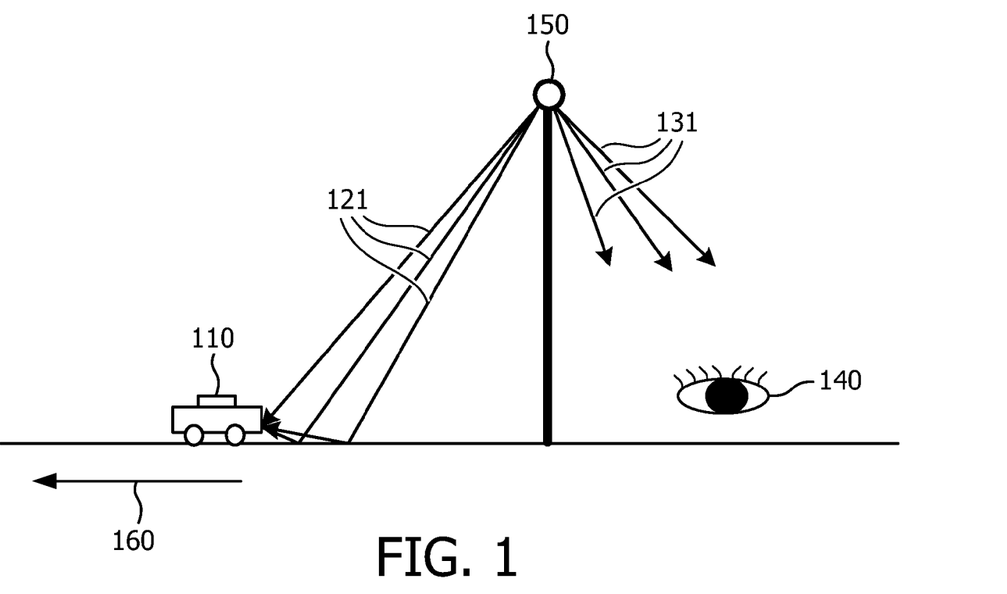
FIG. 1 shows a side view of an application scenario to which a conventional lighting device is applied.

Based on the experiments conducted by the inventor, two conclusions have been drawn. The first one is that, for the visibility of object, the main contributor is the light beam opposite to the observer rather than the light beam towards the observer. To be specific, referring to FIG. 1, the car 110 (i.e., object) is moving along the direction denoted by arrow 160, and to ensure the visibility of the car 110, lighting device 150 emitting the light beam 121 opposite to the observer 140 outweigh the light beam 131 towards the observer 140.

Figure 2:
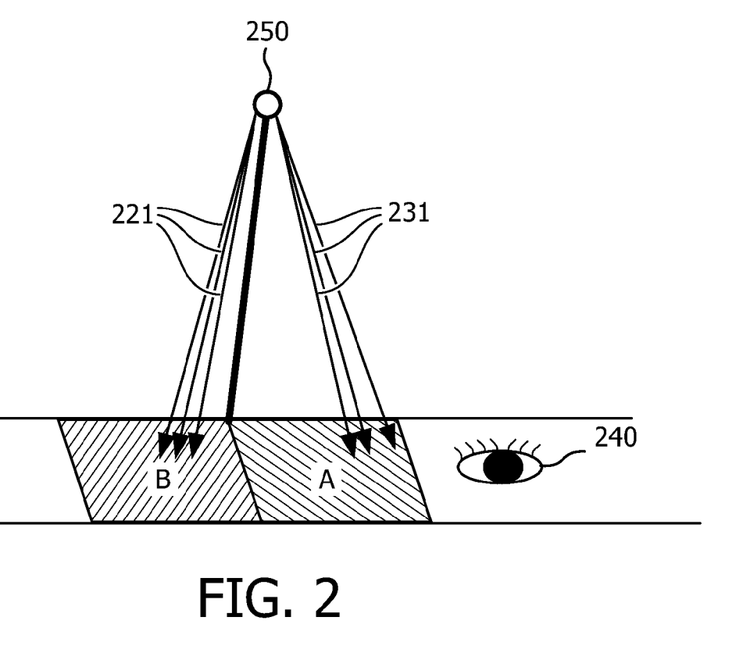
FIG. 2 shows a perspective view of a lighting pattern generated by a conventional lighting device.

The second one is that, for illuminating the area of the road surface, using the light beam towards the observer can save much more energy than using the light beam opposite to the observer. To be specific, referring to FIG. 2, the light beam 221 (i.e., the light beam opposite to the observer 240) of the lighting device 250 is used to illuminate the area B of the road surface, and the light beam 231 (i.e., the light beam towards the observer 240) is used to illuminate the area A of the road surface. The experiments conducted by the inventor show that the perceived luminance of area A is 3 times higher than that of area B by observer 240; therefore, to achieve the same lighting level on the road surface, illuminating the area A could save energy about three times than illuminating the area B.

Typically, in rush time, the traffic flow is heavy and thus the visibility of the forward objects is quite important to ensure road traffic safety; in non rush time, the traffic flow is relatively low and thus visual task for drivers is much easier. Based on these concerns and the above two conclusions drawn by the inventor, it would be advantageous to achieve a lighting device which can increase the visibility of objects in rush time to ensure the traffic safety and/or save energy in non-rush time while keeping the same lighting level as normal.

In one aspect, one embodiment of the invention provides a lighting device. The lighting device for road lighting comprises a lighting module; and a control module coupled to the lighting module, and configured to control the lighting module to radiate a first light beam towards a first direction to generate a first lighting pattern on the road surface, when a first predetermined condition is satisfied, and to control the lighting module to radiate a second light beam towards a second direction to generate a second lighting pattern on the road surface, when a second predetermined condition is satisfied, wherein the first direction is oriented to go along the traffic direction and the second direction is oriented to go opposite the traffic direction.

Advantageously, the first predetermined condition comprises any one or more of:
  the current traffic flow of the road surface being within a first flow range;
  the current time being within a first time range;
  a first trigger signal being received;
and the second predetermined condition comprises any one or more of:
  the current traffic flow of the road surface being within a second flow range;
  the current time being within a second time range;
  a second trigger signal being received.

The lighting device of the present invention could generate the first light beam towards the first direction that goes along the traffic direction, when the first predetermined condition is satisfied, and generate the second light beam towards the second direction that goes opposite the traffic direction, when the second predetermined condition is satisfied. For example, when the current traffic flow is within the first flow range (e.g., in rush time), the lighting device is controlled to generate the first light beam towards the first direction. As the first direction is oriented to go along the traffic direction, almost all the light beam of the lighting device is directed at the rear of the forward objects and thus the visibility of the forward objects is increased. Therefore, compared to the conventional lighting device with the same power, the lighting device of the present invention could increase the visibility of the forward objects on the road surface while reducing glaring, and thus ensure the traffic safety better.

When the current traffic flow is within the second flow range (e.g., in non rush time), the lighting device is controlled to generate the second light beam towards the second direction. As the second direction is oriented to go opposite the traffic direction, the luminance on the road surface illuminated by the lighting device is much higher than that of the conventional lighting device with the same power. In this regard, to achieve the same lighting level as normal, the power of the second light beam can be reduced, and thereby the energy saving of the lighting device is achieved.

In another aspect, one embodiment of the invention provides a lighting apparatus. The lighting apparatus comprises a support mounted on the road surface and the lighting device according to the first aspect of this invention mounted on the support and oriented relative to the road surface such that the lighting apparatus radiates the first light beam towards the first direction to generate the first lighting pattern on the road surface when the first predetermined condition is satisfied, and radiate the second light beam towards the second direction to generate the second lighting pattern on the road surface when the second predetermined condition is satisfied.

In still another aspect, one embodiment of the invention provides a lighting system, comprises a plurality of lighting apparatuses according to the second aspect of this invention, wherein the support of each of the plurality of lighting apparatuses is configured to be mounted on the road surface and spaced apart one another such that the first lighting patterns of the plurality of lighting apparatuses cover the whole road surface, and the second lighting patterns of the plurality of lighting apparatuses cover the whole road surface.

In still another aspect, one embodiment of the invention provides a method of controlling the lighting device according to claim 1 to generate an illuminance on a road surface, the method comprising the steps of:
  determining whether a first predetermined condition is satisfied or a second predetermined condition is satisfied;
  controlling the lighting device to radiate a first light beam towards a first direction to generate a first lighting pattern on the road surface when the first predetermined condition is satisfied, and controlling the lighting device to radiate a second light beam towards a second direction to generate a second lighting pattern on the road surface when the second predetermined condition is satisfied.

BRIEF DESCRIPTION OF THE DRAWINGS

The above and other objects and features of the present invention will become more apparent from the following detailed description considered in connection with the accompanying drawings, in which.

DETAILED DESCRIPTION

Reference will now be made to embodiments of the invention, one or more examples of which are illustrated in the figures. The embodiments are provided by way of explanation of the invention, and are not meant as a limitation of the invention. For example, features illustrated or described as part of one embodiment may be used with another embodiment to yield still a further embodiment. It is intended that the invention encompass these and other modifications and variations as come within the scope and spirit of the invention.

Figure 3:
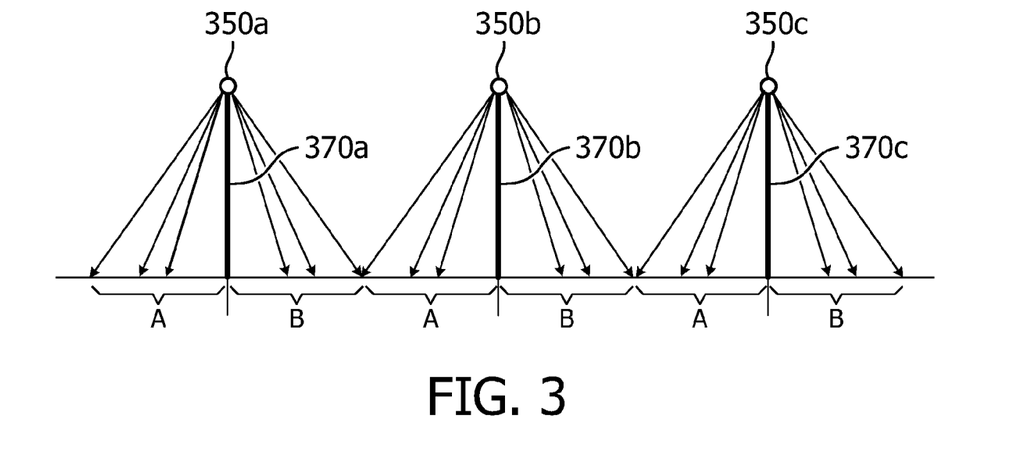
FIG. 3 shows a side view of an application scenario to which a conventional lighting system is applied.

FIG. 3 shows a side view of an application scenario to which a conventional lighting system is applied. For illustrative purposes only, three conventional lighting devices 350a, 350b and 350c are shown in FIG. 3.

Referring to FIG. 3, each of the three conventional lighting devices 350a, 350b and 350c has a symmetrical light distribution and generates two lighting patterns A and B on the road surface. The lighting patterns A and B are symmetric about the support 370a, 370b, 370c on which the lighting device 350a, 350b, 350c is mounted.

The lighting device, the lighting apparatus and the lighting system of embodiments of the invention are the improvement of the conventional lighting device, the conventional light apparatus and the conventional lighting system.

Figure 4:
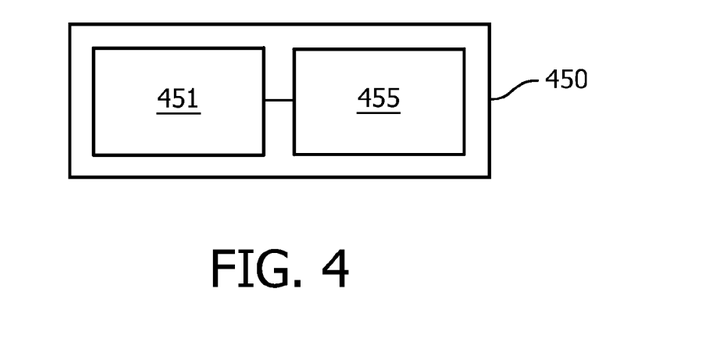
FIG. 4 shows a block diagram of the lighting device according to one embodiment of the present invention.

FIG. 4 shows a block diagram of the lighting device according to one embodiment of the present invention. The lighting device 450 for road lighting comprises a lighting module 451 and a control module 455 coupled to the lighting module 451. The control module 455 is configured to control the lighting module 451 to radiate a first light beam towards a first direction to generate a first lighting pattern on the road surface, when a first predetermined condition is satisfied, and to control the lighting module 451 to radiate a second light beam towards a second direction to generate a second lighting pattern on the road surface, when a second predetermined condition is satisfied. The first direction is oriented to go along the traffic direction and the second direction is oriented to go opposite the traffic direction.

The first predetermined condition and the second predetermined condition can be implemented in various scenarios. In one example, the first predetermined condition may be the current traffic flow of the road surface being within the first flow range, and the second predetermined condition may be the current traffic flow of the road surface being within the second flow range. In this case, the control module 455 may comprise a sensor and a processor coupled to the sensor. The sensor measures the current traffic flow and provides the outcome to the processor. The processor receives the outcome from the sensor and determines whether the current traffic flow is within the first flow range or within the second flow range based on the received outcome. If the outcome indicates that the current traffic flow is within the first flow range, for example, from 300 pcu/min to 2000 pcu/min, then the processor controls the lighting module 451 to radiate the first light beam towards the first direction. If the outcome indicates that the current traffic flow is within the second flow range, for example, from 0 to 300 pcu/min, then the processor controls the lighting module 451 to radiate the second light beam towards the second direction. Advantageously, the sensor measures the current traffic flow periodically, for example, every 5 minutes.

In another example, the first predetermined condition may be the current time being within the first time range, and the second predetermined condition may be the current time being within the second time range. In this case, the control module 455 may comprise a timer and a processor coupled to the timer. The processor obtains the time value from the timer and determines whether the current time is within the first time range or within the second time range. If the time value indicates the current time is within the first time range, for example within the time range from 18:00 to 21:00, then the processor controls the lighting module 451 to radiate the first light beam towards the first direction. If the time value indicated the current time is within the second time range, for example within the time range from 21:00 to 5:00, then the processor controls the lighting module 451 to radiate the second light beam towards the second direction.

In still another example, the first predetermined condition may be a first trigger signal being received, and the second predetermined condition may be a second trigger signal being received. In this case, the first and second trigger signals may be generated by a manual switch and then provided to the control module 455 of the lighting device 450.

Figure 5:
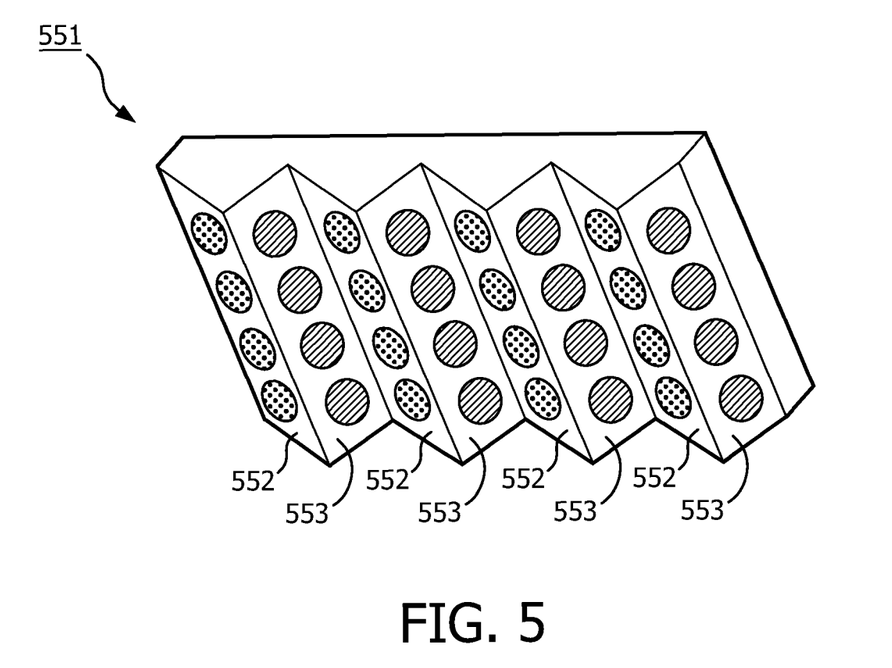
FIG. 5 shows a perspective view of a lighting module according to one embodiment of the invention.

The lighting module of the invention can be achieved by various approaches. In one example, the lighting module 551 may comprise two lighting units 552 and 553, as shown in FIG. 5. When the first predetermined condition is satisfied, the first lighting unit 552 is controlled to radiate the first light beam towards the first direction; when the second predetermined condition is satisfied, the second lighting unit 553 is controlled to radiate the second light beam towards the second direction.

Figure 6:
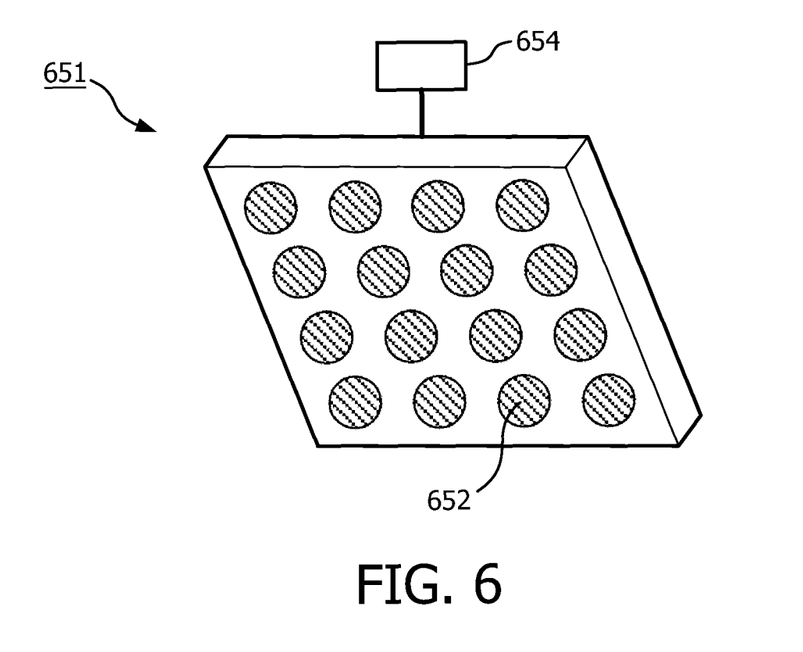
FIG. 6 shows a perspective view of a lighting module according to another embodiment of the invention.

In another example, the lighting module 651 may comprise one lighting unit 652 and a driving unit 654, as shown in FIG. 6. When the first predetermined condition is satisfied, the driving unit 654 is controlled to adjust the orientation of the lighting module 651 to radiate the first light beam towards the first direction; when the second predetermined condition is satisfied, the driving unit 654 is controlled to adjust the orientation of the lighting module 651 to radiate the second light beam towards the second direction. The driving unit may be a motor, for example.

The lighting device 450 of FIG. 4 may be applicable to any suitable lighting scenario. For example, the lighting device 450 may be mounted on a support to constitute a lighting apparatus. A plurality of lighting apparatuses may be mounted on the road surface and spaced apart one another to form a road lighting system, as shown in FIG. 7 and FIG. 8.

Hereinafter, the road lighting system 700 of one embodiment of the invention will be described in detail using the current time being within the first time range as an example of the first predetermined condition and the current time being within the second time range as an example of the second predetermined condition.

Figure 7:
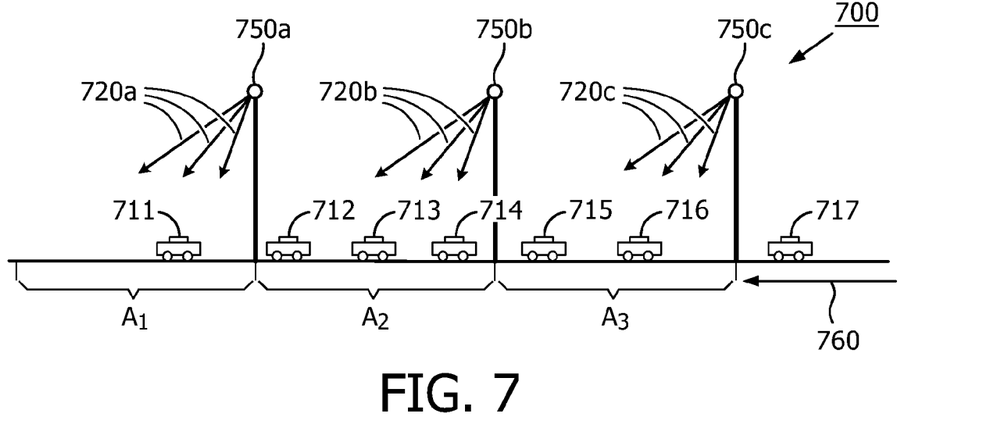
FIG. 7 shows a side view of an application scenario to which a lighting system according to one embodiment of the invention is applied, where the first predetermined condition is satisfied.
Figure 8:
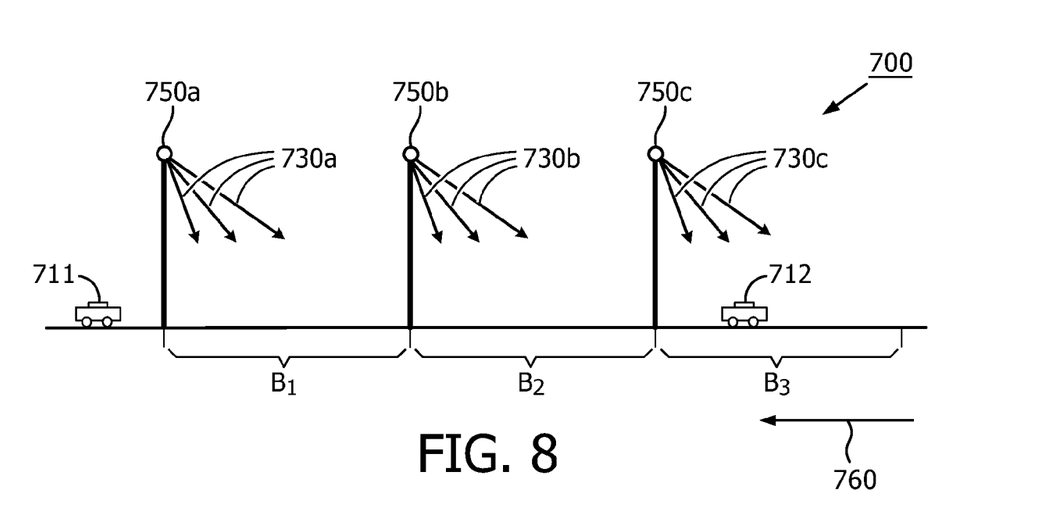
FIG. 8 shows a side view of an application scenario to which a lighting system according to one embodiment of the invention is applied, where the second predetermined condition is satisfied.

When the current time is within the first time range, for example within the time range from 18:00 to 21:00, which means the current traffic flow is heavy, then all the light devices 750a, 750b and 750c of the lighting system 700 are controlled to radiate the first light beams 720a, 720b and 720c towards the first direction, i.e., the direction that goes along the traffic direction 760, as shown in FIG. 7. Since almost all light beams of the lighting devices 750a, 750b and 750c are directed at the rear of the forward objects and thus the visibility of the forward objects is increased. To be specific, for example, for the driver of the car 717, the light beam 720c from the lighting device 750c is directed at the rear of the forward car 716 and thus the visibility of the forward car 716 is increased. The same is true for cars 711, 712, 713, 714 and 715.

Therefore, compared to the conventional lighting system with the same power illustrated in FIG. 3, the lighting system 700 of the invention could increase, for drivers behind, the visibility of forward cars while reducing glaring, and thus ensure the traffic safety better.

When the current time is within the second time range, for example within the time range from 21:00 to 5:00, which means the current traffic flow is low, then all the light devices 750a, 750b and 750c of the lighting system 700 are controlled to radiate the second light beams 730a, 730b and 730c towards the second direction, i.e., the direction that goes opposite the traffic direction 760, as shown in FIG. 8. Since almost all light beams of the lighting devices 750a, 750b and 750c are directed to the second direction that goes opposite to the traffic direction 760, in order to generate the same lighting level, the lighting devices 750a, 750b and 750c of the lighting system 700 can consume less energy than that of the conventional lighting system of FIG. 3. Using the configuration of the lighting module 551 of FIG. 5 as an example, the power of the second lighting unit 553 can be set to be smaller than that of the first lighting unit 552. In this way, the energy saving of the lighting system 700 is achieved.

Advantageously, the lighting devices 750a, 750b and 750c of the lighting system 700 are oriented with respect to the road surface such that the lighting patterns $A_1$, $A_2$ and $A_3$ on the road surface are consecutive to each other and the lighting pattern $B_1$, $B_2$ and $B_3$ on the road surface are consecutive to each other, which means the lighting patterns of the lighting system 700 cover the whole road surface. In this way, a uniform illuminance can be achieved on the road surface.

Figure 9:
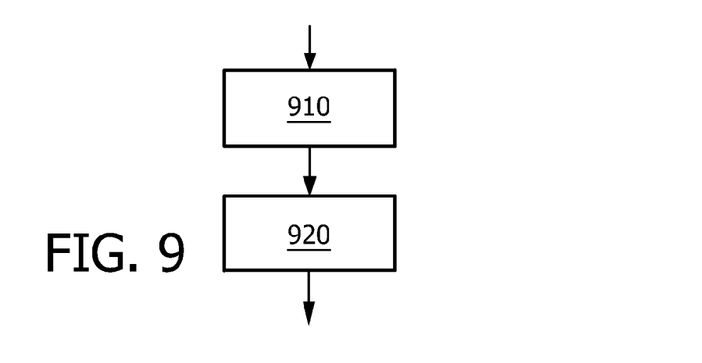
FIG. 9 shows a flow chart of a method of controlling a lighting device according to the present invention.

FIG. 9 shows a flow chart of a method of controlling a lighting device according to the present invention.

The method of FIG. 9 comprises Step 910 of determining whether a first predetermined condition is satisfied or a second predetermined condition is satisfied; and Step 920 of controlling the lighting device to radiate a first light beam towards a first direction to generate a first lighting pattern on the road surface when the first predetermined condition is satisfied, and controlling the lighting device to radiate a second light beam towards a second direction to generate a second lighting pattern on the road surface when the second predetermined condition is satisfied.

The first predetermined condition may comprise any one or more of:
  the current traffic flow of the road surface being within a first flow range;
  the current time being within a first time range;
  a first trigger signal being received.

The second predetermined condition comprises any one or more of:
  the current traffic flow of the road surface being within a second flow range;
  the current time being within a second time range;
  a second trigger signal being received.

In one example, when the first predetermined condition is the current traffic flow of the road surface being within the first flow range, and the second predetermined condition is the current traffic flow of the road surface being within the second flow range, Step 910 may comprise the step of: determining whether the current traffic flow is within the first flow range or within the second flow range; and Step 920 may comprise the step of: controlling the lighting device to radiate the first light beam towards the first direction when the current traffic flow is within the first flow range, and controlling the lighting device to radiate the second light beam towards the second direction when the current traffic flow is within the second flow range.

In another embodiment, when the first predetermined condition is the current time being within the first time range, and the second predetermined condition is the current time being within the second time range, Step 910 may comprise the step of: determining whether the current time is within the first time range or within the second time range; and Step 920 may comprise the step of: controlling the lighting device to radiate the first light beam towards the first direction when the current time is within the first time range, and controlling the lighting device to radiate the second light beam towards the second direction when the current time is within the second time range.

It should be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A lighting device for road lighting, the lighting device comprising:
    a lighting module; and
    a control module coupled to the lighting module, and configured to control the lighting module to radiate a first light beam towards a first direction to generate a first lighting pattern on the road surface, when a first predetermined condition is satisfied, and to control the lighting module to radiate a second light beam towards a second direction to generate a second lighting pattern on the road surface, when a second predetermined condition is satisfied;
    wherein the first direction is oriented to go along the traffic direction and the second direction is oriented to go opposite the traffic direction.

2. The lighting device of claim 1, wherein the first predetermined condition comprises any one or more of:
    the current traffic flow of the road surface being within a first flow range;
    the current time being within a first time range;
    a first trigger signal being received;
    wherein the second predetermined condition comprises any one or more of:
    the current traffic flow of the road surface being within a second flow range;
    the current time being within a second time range;
    a second trigger signal being received.

3. The lighting device of claim 2, wherein when the first predetermined condition is the current traffic flow of the road surface being within the first flow range, and the second predetermined condition is the current traffic flow of the road surface being within the second flow range, the control module comprises:
    a sensor configured to measure the current traffic flow; and
    a processor coupled to the sensor and configured to control the lighting module to radiate the first light beam towards the first direction when the current traffic flow measured by the sensor is within the first flow range, and to control the lighting module to radiate the second light beam towards the second direction when the current traffic flow measured by the sensor is within the second flow range.

4. The lighting device of claim 2, wherein when the first predetermined condition is the current time being within the first time range, and the second predetermined condition is the current time being within the second time range, the control module comprises:
    a timer; and
    a processor coupled to the timer, and configured to control the lighting module to radiate the first light beam towards the first direction when the time value of the timer indicates the current time is within the first time range, and to control the lighting module to radiate the second light beam towards the second direction when the time value of the timer indicates the current time is within the second time range.

5. The lighting device of claim 1, wherein the lighting module comprises a first lighting unit and a second lighting unit, wherein the control unit is configured to control the first lighting unit to radiate the first light beam towards the first direction when the first predetermined condition is satisfied, and to control the second lighting unit to radiate the second light beam towards the second direction when the second predetermined condition is satisfied.

6. The lighting device of claim 5, wherein the power of the second lighting unit is smaller than the power of the first lighting unit.

7. The lighting device of claim 1, wherein the lighting module comprises a lighting unit and a driving unit coupled to the lighting unit, wherein the control unit is configured to control the driving unit to adjust the orientation of the lighting unit to radiate the first light beam towards the first direction when the first predetermined condition is satisfied, and to control the driving unit to adjust the orientation of the lighting unit to radiate the second light beam towards the second direction when the second predetermined condition is satisfied.

8. A lighting apparatus, comprising:
    a support mounted on the road surface;
    the lighting device according to claim 1 mounted on the support and oriented relative to the road surface such that the lighting apparatus radiates the first light beam towards the first direction to generate the first lighting pattern on the road surface when the first predetermined condition is satisfied, and radiate the second light beam towards the second direction to generate the second lighting pattern on the road surface when the second predetermined condition is satisfied.

9. A lighting system, comprising:
    a plurality of lighting apparatuses according to claim 8, wherein the support of each of the plurality of lighting apparatuses is configured to be mounted on the road surface and spaced apart one another such that the first lighting patterns of the plurality of lighting apparatuses cover the whole road surface, and the second lighting patterns of the plurality of lighting apparatuses cover the whole road surface.

10. A method of controlling the lighting device according to claim 1 to generate an illuminance on a road surface, the method comprising the steps of:
    determining whether a first predetermined condition is satisfied or a second predetermined condition is satisfied;
    controlling the lighting device to radiate a first light beam towards a first direction to generate a first lighting pattern on the road surface when the first predetermined condition is satisfied, and controlling the lighting device to radiate a second light beam towards a second direction to generate a second lighting pattern on the road surface when the second predetermined condition is satisfied.

11. The method of claim 10, wherein the first predetermined condition comprises any one or more of:
    the current traffic flow of the road surface being within a first flow range;

the current time being within a first time range;

a first trigger signal being received;

wherein the second predetermined condition comprises any one or more of:

the current traffic flow of the road surface being within a second flow range;

the current time being within a second time range;

a second trigger signal being received.

12. The method of claim 10, wherein when the first predetermined condition is the current traffic flow of the road surface being within the first flow range, and the second predetermined condition is the current traffic flow of the road surface being within the second flow range, the step of determining comprises:

determining whether the current traffic flow is within the first flow range or within the second flow range;

wherein the step of controlling comprises:

controlling the lighting device to radiate the first light beam towards the first direction when the current traffic flow is within the first flow range, and controlling the lighting device to radiate the second light beam towards the second direction when the current traffic flow is within the second flow range.

13. The method of claim 10, wherein when the first predetermined condition is the current time being within the first time range, and the second predetermined condition is the current time being within the second time range, the step of determining comprises:

determining whether the current time is within the first time range or within the second time range;

wherein the step of controlling comprises:

controlling the lighting device to radiate the first light beam towards the first direction when the current time is within the first time range, and controlling the lighting device to radiate the second light beam towards the second direction when the current time is within the second time range.

* * * * *